No. 804,328. PATENTED NOV. 14, 1905.
A. LUTZE.
MACHINE FOR MOLDING PLASTIC MASSES.
APPLICATION FILED FEB. 20, 1905.

2 SHEETS—SHEET 1.

Witnesses:

Inventor:
Alfred Lutze
by Eustace W. Hopping
Attorney

No. 804,328.  
PATENTED NOV. 14, 1905.

A. LUTZE.  
MACHINE FOR MOLDING PLASTIC MASSES.  
APPLICATION FILED FEB. 20, 1905.

2 SHEETS—SHEET 2.

Witnesses:

Inventor:  
Alfred Lutze  
by Eustace N. Hopkins  
Attorney

UNITED STATES PATENT OFFICE.

ALFRED LUTZE, OF HALLE-ON-THE-SAALE, GERMANY.

MACHINE FOR MOLDING PLASTIC MASSES.

No. 804,328.          Specification of Letters Patent.          Patented Nov. 14, 1905.

Application filed February 20, 1905. Serial No. 246,573.

*To all whom it may concern:*

Be it known that I, ALFRED LUTZE, a citizen of the German Empire, residing at Halle-on-the-Saale, Germany, have invented certain new and useful Improvements in Machines for Molding Plastic Masses, of which the following is a description.

The present invention relates to machines for molding plastic masses, such as dough and other substances; and it consists of the details of construction hereinafter set forth, and particularly pointed out in the claims.

In order to render the present specification easily intelligible, reference is had to the accompanying drawings, in which similar numerals of reference denote similar parts throughout the several views.

Figures 1, 2:
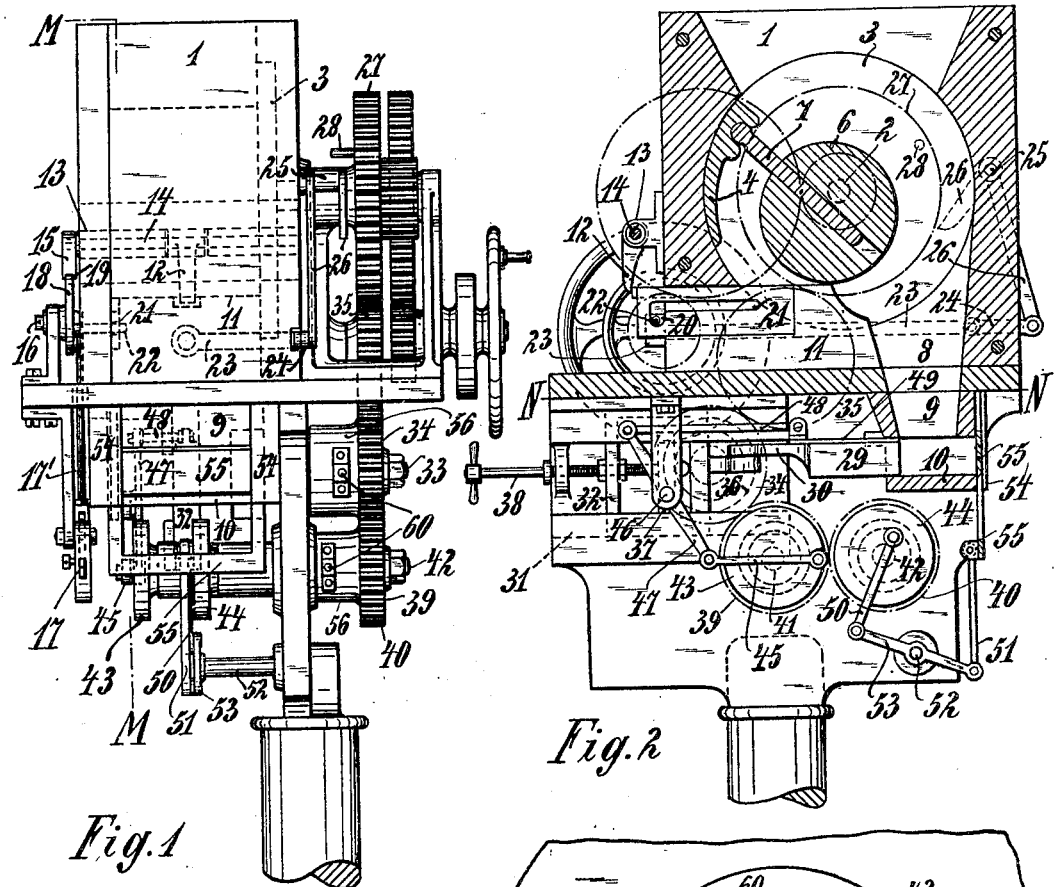
Figure 3:
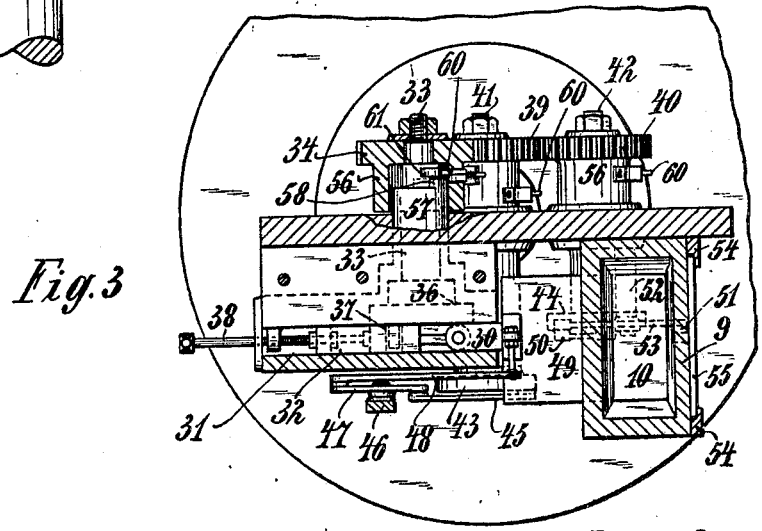
Figure 4:
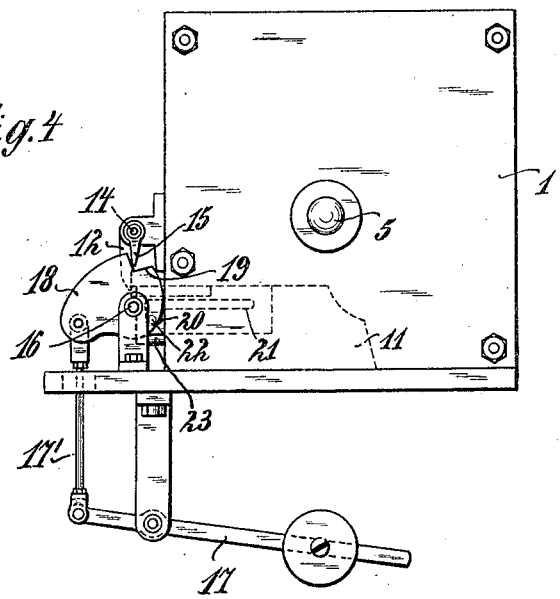
Figure 5:
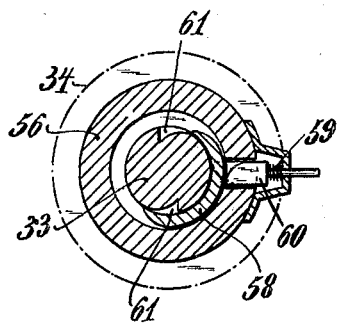
Figure 6:
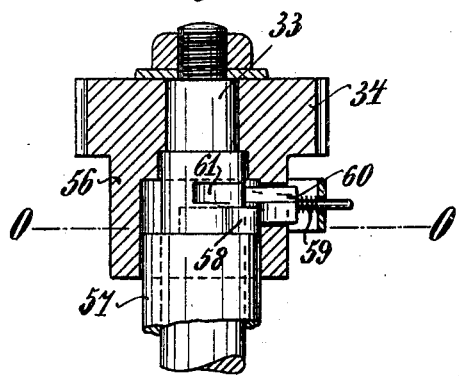

Figure 1 is a side elevation of the machine; Fig. 2, a vertical section on the line M M of Fig. 1; Fig. 3, a horizontal section on line N N of Fig. 2; Fig. 4, a detail elevation showing the mechanism for regulating the density of the cakes molded; Fig. 5, a section on line O O of Fig. 6, showing a coupling used in connection with the molding mechanism, drawn to a larger scale; and Fig. 6, a horizontal section on the center line of Fig. 5.

The feed-hopper for the plastic mass is indicated at 1, and the interior of the same is cylindrical in shape and has at one end the circular disk 3, mounted on a shaft 2, extending into the hopper. The disk 3 is rotated at the required speed by any suitable gearing. Close to the outer edge of the disk 3 a segmental partition 4 is mounted, which extends across the whole interior width of the hopper, and close to one end of this partition a recess is formed to receive the end of a slide 7, guided in a roll 6, mounted on an eccentric trunnion 5. When the disk 3 is rotated, the slide 7 and the roll 6 will force the mass through the opening 8 and the mouthpiece 9 into the mold 10. Between the opening 8 and the roll 6 a slide-block 11 is mounted, which is normally actuated toward the opening 8 by means of a weighted lever 17, Fig. 4. A pawl 12, pivoted on a shaft 14, mounted in a bearing 13, bears against the rear end of the slide-block 11. To the outer end of the shaft 14 is fixed a second pawl 15, with which a cam-disk 18 engages, said cam-disk being pivotally supported at 16 and linked to the weighted lever 17 by the link 17'. The action of the weighted lever 17 is to force the shoulder 19 of the cam-disk against the pawl 15, and thus to force the slide-block 11 toward the opening 8. Thus the mass passing into the mold will be held back by the block 11 until it has received the required density, when the action of the roll and the slide 7 will force the mass past the block and into the mold. Thus it will be assured that each pat or cake will have the same density, and consequently for equal size will be of equal weight. The feed of the mass to the mold will then be cut off by the movement of the segmental partition 4 over the orifice 8.

As the block 11 is forced backward it will rock the shaft 14 by means of the pawl 12, and this will cause the pawl 15 to turn the cam-disk 18 on its pivot. The disk carries on its face a pin 22, which engages in the dip 20 of a horizontal groove 21 in the side of the block 11, and when the cam-disk 18 is turned, as previously described, the pin 22 will be raised out of the dip into the horizontal part 21 of the said groove, and thus the pawls 12 and 15 will be relieved of the weight of lever 17. The block 11 is linked to the end of the lower arm 26 of a bell-crank lever, pivotally mounted at 25 by means of links 23 and 24, and the upper shorter arm 26 of this lever lies in the path of movement of a pin 28, fixed in the face of one of the driving-gears 27. As this pin comes round it will depress the arm 26 of the bell-crank lever, and since the pin 22 has been raised to the horizontal part of the groove 21 the links 23 24 will pull forward the block again ready for another charge of the mass.

The rear end of the mold 10 is closed by means of the plunger 29, said plunger being linked at 30 to a frame 32, adapted to slide in suitable guideways 31. This frame is reciprocated at the proper time by means of a crank-pin disk 36, driven by suitable gearing 34 on the stub-shaft 33 and intermediate gear 35. A cross-piece 37 is mounted in the frame 32, and this cross-piece can be adjusted, by means of the screw-spindle 38, as regards the crank-pin disk 36 so that the stroke of the frame, and with it the plunger 29, may be regulated at will. The gear 34 meshes with a gear 39 and this gear again with a gear 40, the said gears 39 and 40 being mounted on the shafts 41 and 42, respectively, which each carry a crank-pin disk 43 and 44. A sliding cutter 49 is mounted above the plunger 29 and guided on the same, and a double-arm rocking lever 47 is pivotally supported in the machine-frame at 46. The lower end of the rocking lever is linked to the crank-pin of disk 43 by the link 45, and the upper end is linked by arm 48 to the sliding cutter 49, so that when the disk 43 is rotated at the proper moment the sliding cutter will be moved under the orifice 8 and mouthpiece 9 and cut off the mass which had been previously forced into the mold 10. The forward end of the mold is closed by the vertically-reciprocating shutter 55, which is in the form of a frame and guided at 54 on the face of the mold. This shutter is reciprocated at the proper moment by means of the crank-pin of disk 44, to which the shutter is connected up by means of the link 51, double-arm rocking lever 53, pivotally mounted to the machine-frame at 52, and the link 50. On reciprocation this shutter alternately closes and opens the mold.

The three gears 34, 39, and 40 are each provided with a prolonged hub 56, in the recesses of which, Figs. 5 and 6, the bushings 57 of the respective shafts 33, 41, and 42 run and form the bearings for these shafts. Each bushing is provided at its end with a cam 58, and each annular hub 56 has a pin 60, having a ratchet-like end mounted therein and normally spring-pressd inwardly by the spring 59, and these pins are adapted to engage at the proper moment with ratchet-recesses 61, formed in the circumference of the shafts 33, 41, and 42. When the pin 60 engages one of the ratchet-recesses 61 of the respective shafts, it will turn this shaft, and with it the corresponding crank-pin disk, until the said pin is disengaged from the recess by the action of the cam 58, as will be readily understood on reference to Figs. 5 and 6. Thus the crank-pin disks 36, 43, and 44 will be alternately partially rotated and will then stand still, so that the cutter 49 and shutter 55 will remain stationary after each operation.

The various mechanisms are timed to operate in the following manner: When the parts are in the positions shown in the drawings, the mass is being filled into the mold and its density determined by the weighted lever 17 and the action of the block 11. During this filling process the shaft 41 of the crank-pin disk 43 is being coupled to the gear 39, so that the moment the mold has been charged and the segmental partition 4 has cut off the further feed for the time being the cutter 49 is passed across the opening of the mouthpiece 9 and cuts off the mass in the mold. In the meantime the gear 40 has become coupled to the shaft 42 of the crank-pin disk 44, which now sets the lever system 50, 53, and 51 in motion and moves the shutter 55, so as to open the mold 10. At the next instant the crank-pin disk 36 of the sliding frame 32 is set in motion, and the plunger 29 forces the pat or cake out of the mold, whereupon the parts are automatically returned to their initial positions, and the filling operation commences again.

By means of the above-described mechanism it is attained that not only are the cakes formed of exactly the same size and shape, but owing to the control of their density by means of the block 11 their weight will in every case be equal.

I claim as my invention—

1. In a machine for molding plastic substances having a hopper and mold mounted thereunder and means for forcing the mass into the mold, the combination of a sliding block mounted between the hopper and the mold-inlet, and a weighted lever to control said block and means for returning the same to its initial position after it has been moved back by the pressure of the material which has entered the mold.

2. In a machine for molding plastic substances, the combination of a feed-hopper having a cylindrical interior an outlet thereto leading downwardly and having a mouthpiece below it, a mold mounted beneath said mouthpiece, a feed-roll and slide to force the plastic material through the said outlet into the mold, a slide-block mounted between the said feed-roll and mold and adapted to yield backwardly, a weighted-lever system to control said slide-block and means for releasing the said block from the weight of the system after it has been forced back by the material entering the mold and for returning the said block to its initial position after it has been released from the weight-pressure substantially as described.

3. In a machine for molding plastic substances, the combination of a feed-hopper, a mold and an outlet from the said hopper to the mold, a slide-block mounted between the feeding device and the outlet to the mold, a weighted-lever system to control the position of said mold, means for relieving the said block from pressure and for returning it to its initial position after it has been forced back by the pressure of the material being fed to the mold, a segmental partition to close the outlet from the hopper to the mold after the said block has been forced back substantially as described.

4. In a machine for molding plastic substances, the combination of a feed-hopper having an opening, a mold beneath the said hopper into which said opening leads, a weight-controlled sliding block adapted to be forced back by the pressure of the mass entering the mold and means in connection with said block to return the same to its initial position after it has been forced back, a segmental partition to close the hopper-opening to the mold after the block has been forced back, a cutter at the top of the mold and means for periodically pushing the same forward to close the mold at the top, a vertically-reciprocatory shutter to close the outlet of the mold and means for periodically removing the same and a plunger and means for periodically forcing the same forward to remove the contents of the mold substantially as described.

5. In a machine for molding plastic substances, the combination of a feed-hopper having a cylindrical interior, a mold mounted beneath the same and an opening from the hopper to the mold, means for forcing the contents of the hopper into the said mold a weighted lever and slide-block to control the density of the mass forced into the mold, a plunger forming one side of the mold, a cutter to close the mold at the top and a shutter to close the front of the mold, and crank-pin disks to actuate the said cutters and plunger, rotary gears to operate said crank-pin disks, and means for periodically coupling said gears to said disks for a partial rotation to close the top of the mold, open the front end of the same and force the cake out of the same by means of the plunger substantially as described.

6. In a machine for molding plastic substances, the combination of a feed-hopper, a mold mounted underneath the same an opening from the hopper to the mold a weighted lever and slide-block to control the density of the mass forced into the mold, a cutter to close the top of the mold, a plunger to force the cake out of the mold and a shutter to close the front end of the mold, crank-pin disks to operate the said cutters and the plunger and gears and means for rotating the same to operate said crank-pin disks, hollow hubs to the said gears and bushings for the crank-pin-disk shafts supported in said hollow hubs, ratchet-recesses in the said shaft ends, a spring-pressed pin mounted in the said hollow hubs and adapted to engage said ratchet-recesses and a cam-surface on the end of said bushings to disengage the said pin from the said ratchet-recesses substantially as described.

In testimony whereof I affix my signature in the presence of two witnesses.

ALFRED LUTZE.

Witnesses:
 MORITZ SPREER,
 RUDOLPH FRICKE